US012589601B2

(12) United States Patent
    Tanaka

(10) Patent No.:     US 12,589,601 B2
(45) Date of Patent:        Mar. 31, 2026

(54) LIQUID DISCHARGE APPARATUS, LIQUID DISCHARGE METHOD, AND STORAGE MEDIUM

(71) Applicant: Hideo Tanaka, Kanagawa (JP)

(72) Inventor:  Hideo Tanaka, Kanagawa (JP)

(73) Assignee: Ricoh Company, Ltd., Tokyo (JP)

( * ) Notice:    Subject to any disclaimer, the term of this patent is extended or adjusted under 35 U.S.C. 154(b) by 126 days.

(21) Appl. No.: 18/171,912

(22) Filed:      Feb. 21, 2023

(65)              Prior Publication Data

US 2023/0271415 A1      Aug. 31, 2023

(30)         Foreign Application Priority Data

Feb. 28, 2022     (JP) .................................. 2022-030020

(51) Int. Cl.
    *B41J 3/407*          (2006.01)
    *B25J 9/16*           (2006.01)
    *B41J 2/045*          (2006.01)
(52) U.S. Cl.
    CPC ........... *B41J 3/4073* (2013.01); *B25J 9/1664*
          (2013.01); *B41J 2/04573* (2013.01)
(58) Field of Classification Search
    CPC ..................................................... B41J 3/4073
    See application file for complete search history.

(56)              References Cited

U.S. PATENT DOCUMENTS 6,360,656  B2 *   3/2002   Kubo ...................... B41J 25/003
                                                            400/70
 2007/0175175  A1 *   8/2007   Schwenke ................ H05B 3/86
                                                           52/745.19
 2009/0167817  A1 *   7/2009   Orr ........................ B29C 64/106
                                                            347/37
 2009/0231370  A1 *   9/2009   Ohnishi ................. B41J 3/4073
                                                            347/54
 2023/0034827  A1 *   2/2023   Iwazaki ............... B41M 5/0088

FOREIGN PATENT DOCUMENTS

DE       102018121570        3/2020
    EP         3932678           1/2022
    JP        2012-101146        5/2012
                (Continued)

OTHER PUBLICATIONS

Extended European Search Report for 23157901.2 mailed on Jul. 6, 2023.
Japanese Office Action for 2022-030020 mailed on Aug. 19, 2025.

*Primary Examiner* — Shelby L Fidler
(74) *Attorney, Agent, or Firm* — IPUSA, PLLC

(57)              ABSTRACT

A liquid discharge apparatus includes a head, a position changer, and circuitry. The head has a nozzle. The head discharges a liquid from the nozzle to apply the liquid onto a surface of an object. The head has a prescribed discharge condition. The position changer changes a relative position between the object and the head. The circuitry determines a linear trajectory along which the position changer moves the head based on the prescribed discharge condition, outputs a first command including multiple moving positions along (Continued)

the linear trajectory to the position changer to cause the position changer to move the head along the linear trajectory, and outputs a second command including multiple discharge positions to the head to cause the head to discharge the liquid at the multiple discharge positions.

12 Claims, 10 Drawing Sheets

(56) References Cited

FOREIGN PATENT DOCUMENTS

| JP | 2015-160162 | 9/2015 |
|----|----|----|
| JP | 2016-068290 | 5/2016 |
| JP | 2019-42696 | 3/2019 |
| WO | WO2015/025400 A1 | 2/2015 |
| WO | 2020/048854 | 3/2020 |

* cited by examiner

COMPARATIVE EXAMPLE

FIG. 8

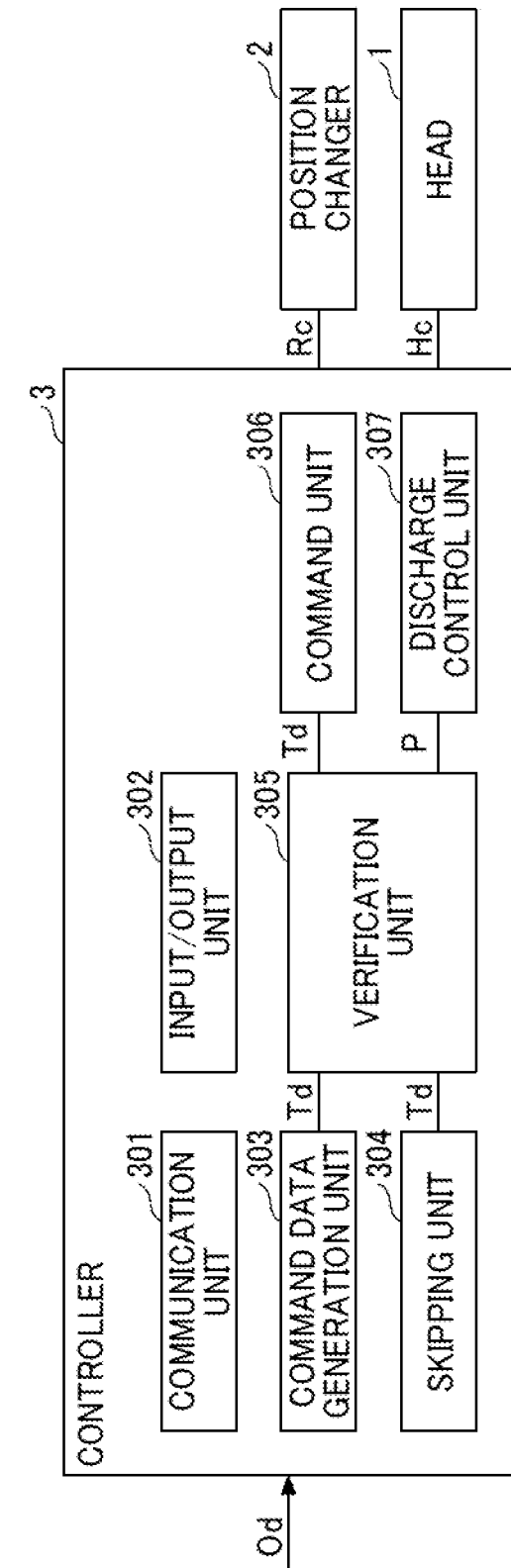

Od

CONTROLLER 3

COMMUNICATION UNIT 301

INPUT/OUTPUT UNIT 302

COMMAND DATA GENERATION UNIT 303

VERIFICATION UNIT 305

COMMAND UNIT 306

SKIPPING UNIT 304

DISCHARGE CONTROL UNIT 307

Td

Td

Td

Td

P

Rc

POSITION CHANGER 2

Hc

HEAD 1

FIG. 9

MOVJ X=100 Y=50 Z=0 A=0 B=45 C=30    //MOVE TO X=100, Y=50, Z=0 BY OPERATING EACH JOINT. A, B, AND C REPRESENT HEAD ANGLE.

MOVL X=200 Y=80 Z=11 A=0 B=30 C=0    //MOVE TO X=100, Y=50, Z=0 BY LINEAR INTERPOLATION. A, B, AND C REPRESENT HEAD ANGLE.

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-030020, filed on Feb. 28, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing a plurality of instructions.

Related Art

In the related art, a liquid discharge apparatus discharges and applies a liquid to an object. Such a liquid discharge apparatus is used for coating a surface of the object with the liquid.

SUMMARY

Embodiments of the present disclosure describe an improved liquid discharge apparatus that includes a head, a position changer, and circuitry. The head has a nozzle. The head discharges a liquid from the nozzle to apply the liquid onto a surface of an object. The head has a prescribed discharge condition. The position changer changes a relative position between the object and the head. The circuitry determines a linear trajectory along which the position changer moves the head based on the prescribed discharge condition, outputs a first command including multiple moving positions along the linear trajectory to the position changer to cause the position changer to move the head along the linear trajectory, and outputs a second command including multiple discharge positions to the head to cause the head to discharge the liquid at the multiple discharge positions.

According to other embodiments of the present disclosure, there are provided a liquid discharge method and a non-transitory storage medium storing a plurality of instructions which, when executed by one or more processors, causes the processors to perform the liquid discharge method. The method includes discharging a liquid from a nozzle of a head to apply the liquid onto a surface of an object. The head has a prescribed discharge condition. The method further includes changing a relative position between the object and the head, determining a linear trajectory along which the head moves based on the prescribed discharge condition, outputting a first command including multiple moving positions along the linear trajectory to move the head along the linear trajectory, and outputting a second command including multiple discharge positions to the head to discharge the liquid at the multiple discharge positions.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a block diagram illustrating a functional configuration of the controller according to the first embodiment;

FIG. 9 is a diagram illustrating an example of data of the moving position;

Figure 1:
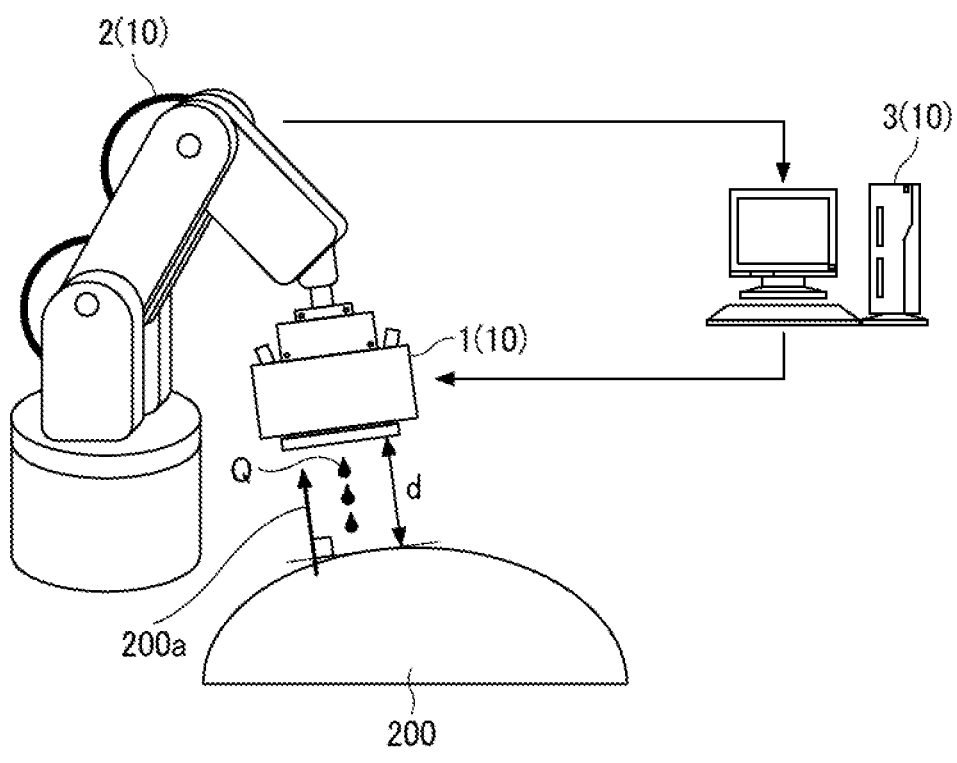
FIG. 1 is a schematic view illustrating an overall configuration of a liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus according to an embodiment of the present disclosure is described with reference to the drawings. However, embodiments described below are some examples of the liquid discharge apparatus for embodying the technical idea of the present disclosure, and embodiments of the present disclosure are not limited to the embodiments described below. The dimensions, materials, and shapes of components, relative arrangements thereof, and the like described below are not intended to limit the scope of the present disclosure thereto unless otherwise specified and are only examples for explanation. The size, positional relation, and the like of components illustrated in the drawings may be exaggerated for clarity of description. In the following description, the same names and the same reference codes represent the same or equivalent components, and a detailed description thereof is omitted as appropriate.

First Embodiment

Overall Configuration of Liquid Discharge Apparatus

An overall configuration of a liquid discharge apparatus 10 according to a first embodiment of the present disclosure is described with reference to FIGS. 1 and 2. FIG. 1 is a schematic view of the liquid discharge apparatus 10, and FIG. 2 is a block diagram of the liquid discharge apparatus 10.

Figure 2:
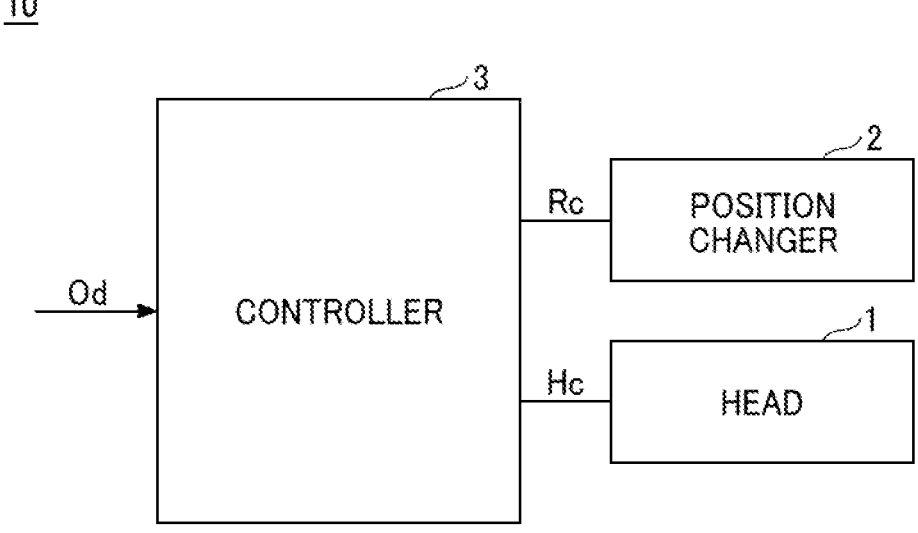
FIG. 2 is a block diagram illustrating the overall configuration of the liquid discharge apparatus according to the first embodiment.

As illustrated in FIGS. 1 and 2, the liquid discharge apparatus 10 includes a head 1, a position changer 2, and a controller 3. The liquid discharge apparatus 10 is a coating apparatus that discharges a liquid Q from the head 1 by an ink jet method and applies the liquid Q to an object 200 to coat a surface of the object 200. Examples of the liquid Q include paint, ink, or the like.

The object 200 has an impermeable surface, such as a body of a car, a truck, or an aircraft. The impermeable surface has a property of preventing a liquid applied to the surface of the object 200 from permeating into the interior. However, the surface of the object 200 is not limited to the impermeable surface and may be a permeable surface. The object 200 has a curved surface having a curvature but may has a flat surface.

The head 1 discharges the liquid Q. The head 1 is a valve jet type that has a nozzle and opens and closes the nozzle to discharge the liquid Q from the nozzle to the object 200. However, the head 1 is not limited to the valve jet type, and may be another drive type such as piezoelectric drive or electrostatic drive. Specifically, the head 1 is a valve jet head having one nozzle.

The position changer 2 changes a relative position and a relative angle between the object 200 and the head 1 in response to a command output from the controller 3. The position changer 2 is, for example, a multi-axis drivable robot arm. That is, the position changer 2 changes an angle (posture) of the head 1 while moving the head 1 held at an end of the robot arm in response to the command. The position changer 2 is not limited to the robot arm and may include a stage that is linearly movable in three axial directions. Alternatively, the position changer 2 may move the object 200 without moving the head 1, or may move both the head 1 and the object 200.

The controller 3 as circuitry outputs the command to the position changer 2 and the head 1 so as to cause the position changer 2 to move the head 1 through multiple moving positions in accordance with the command and cause the head 1 to discharge the liquid Q at multiple discharge positions in accordance with the command.

Specifically, the controller 3 outputs a first command including the multiple moving positions along a linear trajectory, which is described later, to the position changer 2 to cause the position changer 2 to move the head 1 along the linear trajectory and output a second command including the multiple discharge positions to the head 1 to cause the head 1 to discharge the liquid Q at the multiple discharge positions.

In particular, in the present embodiment, the controller 3 causes the position changer 2 to change the relative position between the object 200 and the head 1 so that a discharge distance d between the surface of the object 200 and the head 1 in a normal direction 200a of the surface of the object 200 is different in at least one of the multiple discharge positions.

The controller 3 is implemented by, for example, a personal computer (PC). The controller 3 is connected to the position changer 2 and the head 1 so as to communicate with each other via a wire or wirelessly. The controller 3 outputs a drive command Rc to the position changer 2 to cause the position changer 2 to move the head 1 and outputs a drive signal Hc (i.e., a discharge command) to the head 1 to cause the head 1 to discharge the liquid Q based on shape data Od.

The shape data Od is transmitted from an external device such as an external PC and indicates a shape of the object 200. The shape data Od is created at the time of designing the object 200 or obtained by measuring the object 200 with a three-dimensional measuring device.

Figure 3:
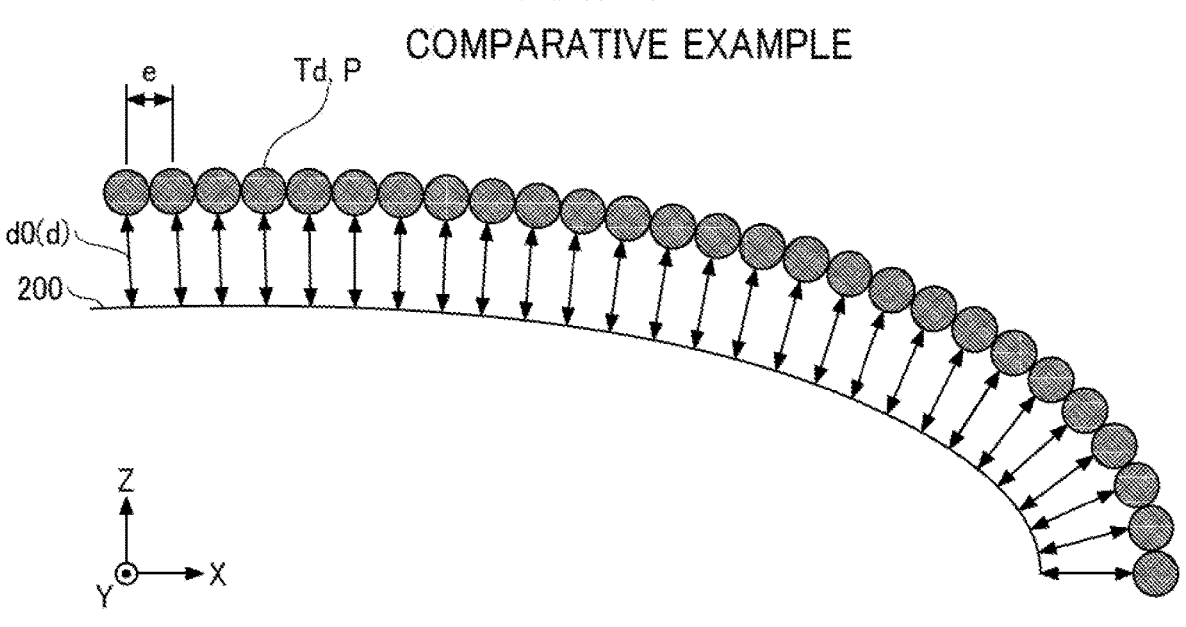
FIG. 3 is a diagram illustrating a first example of a relation between a moving position and a discharge position according to the first embodiment.
Figure 4:
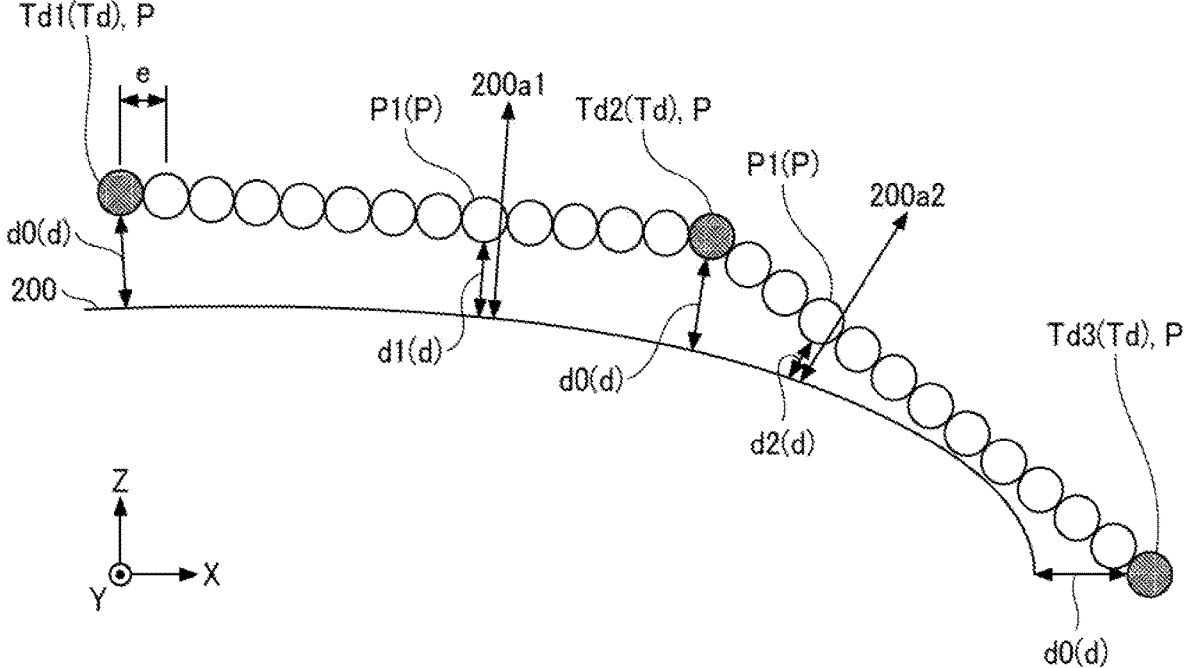
FIG. 4 is a diagram illustrating a second example of the relation between the moving position and the discharge position according to the first embodiment.

Relation Between Moving Position and Discharge Position of Head Moved by Position Changer FIG. 3 is a diagram illustrating a first example (i.e., a comparative example) of a relation between a moving position Td (command position) and a discharge position P in the liquid discharge apparatus 10, and FIG. 4 is a diagram illustrating a second example of the relation between the moving position Td and the discharge position P. FIGS. 3 and 4 illustrate the object 200, multiple moving positions Td, multiple discharge positions P, a discharge distance d, and a discharge interval e.

The multiple moving positions Td are data for changing a relative position between the head 1 and the object 200, serving as the first command indicating a position of the head 1 in the present embodiment. In the present embodiment, the moving position Td further includes data of a relative angle of the head 1, and the position changer 2 changes both the relative position and the relative angle of the head 1 relative to the object 200.

The discharge position P indicates a position of the head 1 when the liquid Q is discharged from the head 1, serving as the second command indicating a liquid discharge timing of the head 1. The discharge interval e is an interval between adjacent discharge positions among the multiple discharge positions P. The discharge interval e corresponds to, for example, a minimum interval at which the head 1 applies the liquid Q to the object 200.

In the first example illustrated in FIG. 3, the number of discharge positions P is equal to the number of moving positions Td. The controller 3 outputs the moving position Td to the position changer 2 at each of the multiple discharge positions P. The head 1 discharges the liquid Q from the nozzle at each of the multiple discharge positions P. Although FIG. 3 illustrates an example in which the discharge positions P and the moving positions Td coincide with each other, the discharge positions P and the moving positions Td may not necessarily coincide with each other.

In the first example illustrated in FIG. 3, since the controller 3 instructs the position changer 2 in the discharge distance d at each of the multiple moving positions Td, the discharge distance d at each of the multiple discharge positions P is substantially the same discharge distance d0. That is, the discharge distances d are uniform at the multiple discharge positions P.

When the number of discharge positions P is equal to the number of moving positions Td as in the first example, the discharge distances d are uniform, and thus the head 1 can discharge the liquid Q in the normal direction of the surface of the object 200. Accordingly, the amount of the liquid Q applied to the surface of the object 200 can be substantially uniform. However, on the other hand, since the position changer 2 changes the relative position and the relative angle of the head 1 at each of the multiple discharge positions P so as to keep the discharge distance d constant, the moving speed of the head 1 may decrease. As a result, the productivity of the liquid discharge apparatus 10 may decrease.

On the other hand, in the second example illustrated in FIG. 4, many of the multiple moving positions Td are skipped as compared with FIG. 3, and only three moving positions Td1, Td2, and Td3 remain. That is, the controller 3 determines the linear trajectory through the multiple moving positions (e.g., the moving positions Td1, Td2, and Td3). Note that the linear trajectory may change in the direction thereof and may include a corner (e.g., the moving position Td2 illustrated in FIG. 4) when the object 200 has a curved surface. The term "skipped" is synonymous with "thinned out," "omitted," and "deleted" in the present disclosure. In other words, the three moving positions Td1, Td2, and Td3 are determined from the multiple moving position, and the other moving positions disposed in intervals between the moving positions Td1 and Td2, and between the moving positions Td2 and Td3 are skipped. The intervals can be determined in advance, for example, by a user or based on the shape data Od (i.e., predetermined intervals). The predetermined intervals are not necessarily constant and may varies, for example, the interval between the moving positions Td1 and Td2, and the interval between the moving positions Td2 and Td3.

In FIG. 4, blank circles between the moving position Td1 and the moving position Td2 indicate the discharge positions P. That is, the discharge position P includes the positions of the blank circles between the moving position Td1 and the moving position Td2, the positions of the blank circles between the moving position Td2 and the moving position Td3, and the positions of the moving positions Td1, Td2, and Td3. The controller 3 acquires data of the multiple discharge positions P by calculation based on the multiple moving positions Td and the shape data Od. The head 1 discharges the liquid Q at each of the multiple discharge positions P while being moved from the moving position Td1 to the moving position Td2 by the position changer 2.

At each of the moving positions Td1, Td2, and Td3, the position changer 2 changes the relative position of the head 1 relative to the object 200 so as to set the discharge distance d to the discharge distance d0. In addition, the position changer 2 changes the relative angle of the head 1 relative to the object 200 so as to discharge the liquid Q from the head 1 in a direction parallel to the normal direction of the surface of the object 200.

On the other hand, the position changer 2 does not adjust the relative position and the relative angle of the head 1 between the moving position Td1 and the moving position Td2. The head 1 linearly moves between the moving position Td1 and the moving position Td2, and discharges the liquid Q at the multiple discharge positions P on a straight line passing through the moving position Td1 and the moving position Td2 along the linear trajectory. Since the head 1 linearly moves between the moving position Td1 and the moving position Td2, when the object 200 has a curved surface, the discharge distance d is different at each discharge position P due to the difference between the curved surface and the straight line. For example, the discharge distance d1 which is the distance between the object 200 and the head 1 in a normal direction 200a1 at the discharge position P1, the discharge distance d2 which is the distance between the object 200 and the head 1 in a normal direction 200a2 at the discharge position P2, and the discharge distance d0 are different from each other. That is, in the second example illustrated in FIG. 4, the discharge distance d is different at the multiple discharge positions P.

In the present embodiment, some of the multiple moving positions Td are skipped as in the second example illustrated in FIG. 4, and the position changer 2 does not adjust the discharge distance d and the relative angle at each of the multiple discharge positions P, thereby preventing the productivity of the liquid discharge apparatus 10 from decreasing. When some of the multiple moving positions Td are skipped, the discharge distances d are uneven, and the amount of the liquid Q applied to the surface of the object 200 may be nonuniform. As a result, the quality of liquid application by the liquid discharge apparatus may be deteriorated. On the other hand, in the present embodiment, the threshold conditions are set for each of the discharge distance d and the relative angle to keep the desired quality of liquid application.

Some of the multiple moving positions Td are skipped while maintaining the discharge distance d and the relative angle within the threshold conditions to keep the desired quality of liquid application, thereby preventing the decrease in productivity while keeping the desired quality of liquid application.

Figure 5:
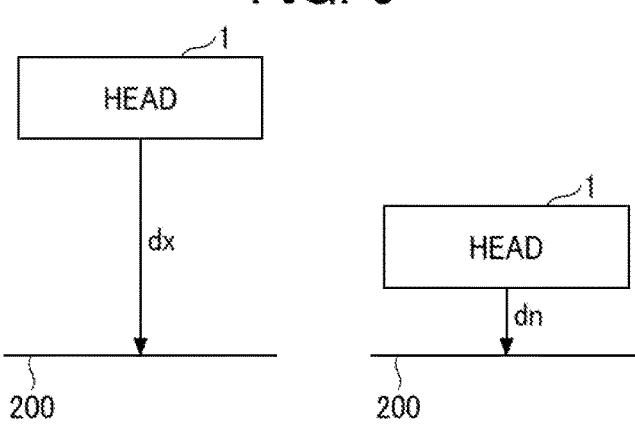
FIG. 5 is a diagram illustrating a discharge distance between an object and a head of the liquid discharge apparatus.

FIG. 5 is a diagram illustrating the discharge distance d between the object 200 and the head 1. The maximum distance dx is the maximum of the discharge distance d that is allowable to keep the desired quality of liquid application (i.e., a maximum dischargeable distance). The minimum distance dn is the minimum of the discharge distance d that is allowable to keep the desired quality of liquid application (i.e., a minimum dischargeable distance). Some of the multiple moving positions Td are skipped so as to maintain the discharge distance d at each of the multiple discharge positions P within a range between the minimum distance dn and the maximum distance dx, thereby keeping the desired quality of liquid application. The maximum distance dx and the minimum distance dn can be determined in advance so as not to deteriorate the quality of liquid application, for example, by a user or based on the shape data Od.

Figure 6:
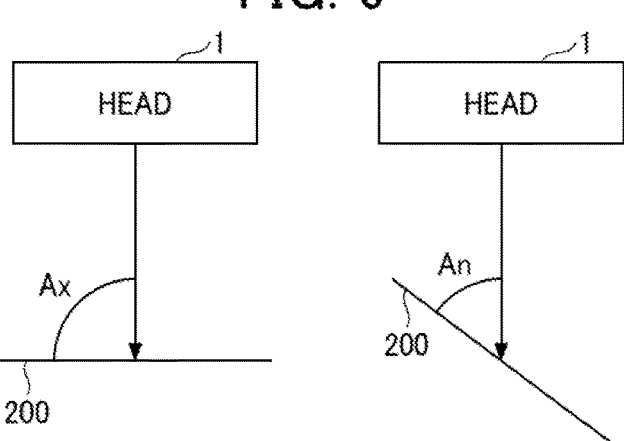
FIG. 6 is a diagram illustrating a relative angle between the object and the head.

FIG. 6 is a diagram illustrating a relative angle A between the object 200 and the head 1. The maximum angle Ax is the maximum of the relative angle A that is allowable to keep the desired quality of liquid application (i.e., a maximum dischargeable angle). The minimum angle An is the minimum of the relative angle A that is allowable to keep the desired quality of liquid application (i.e., a minimum dischargeable angle). Some of the multiple moving positions Td are skipped so as to maintain the relative angle A at each of the multiple discharge positions P within a range between the minimum angle An and the maximum angle Ax, thereby keeping the desired quality of liquid application. The maximum angle Ax and the minimum angle An can be determined in advance so as not to deteriorate the quality of liquid application, for example, by a user or based on the shape data Od.

Configuration of Controller

Example of Hardware Configuration

Figure 7:
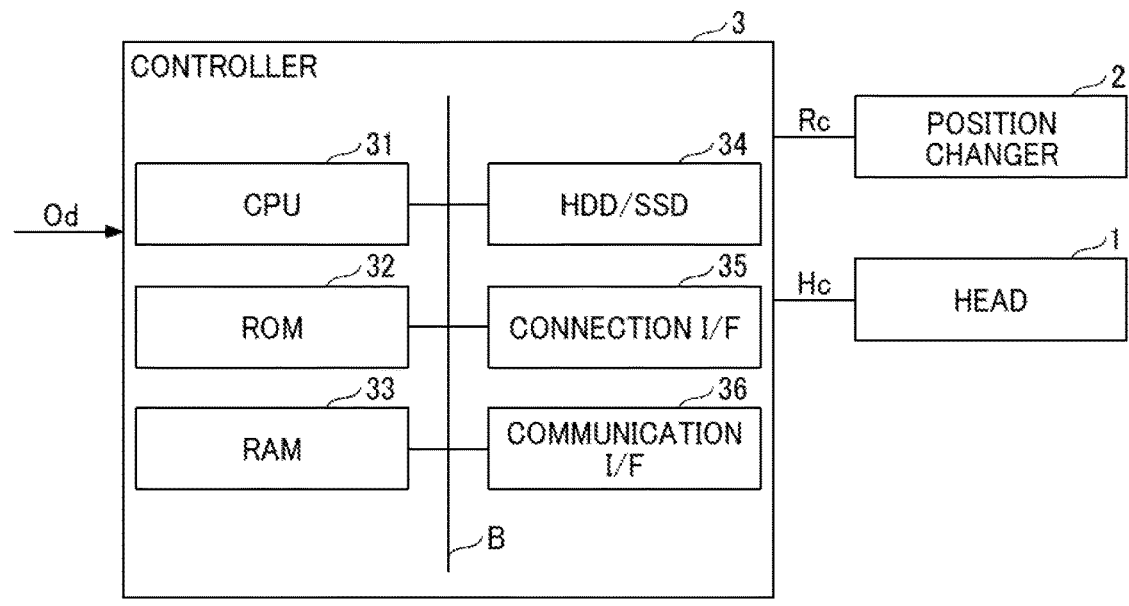
FIG. 7 is a block diagram illustrating a hardware configuration of a controller of the liquid discharge apparatus according to the first embodiment.

FIG. 7 is a block diagram illustrating a hardware configuration of the controller 3. The controller 3 includes a central processing unit (CPU) 31, a read only memory (ROM) 32, a random access memory (RAM) 33, a hard disk drive (HDD)/solid state drive (SSD) 34, a connection interface (I/F) 35, and a communication I/F 36. These components are electrically connected to each other via a system bus B.

The CPU 31 uses the RAM 33 as a work area and executes a program stored in the ROM 32 to control the overall operation of the controller 3.

The ROM 32 is a non-volatile memory that stores a program for controlling, for example, a recording operation to the CPU 31 and other fixed data. The RAM 33 is a volatile memory that temporarily stores various kinds of data.

The HDD/SSD 34 is a nonvolatile memory that stores coating area data, the shape data Od of the body of the object 200, and the like. The CPU 31 may read the data stored in the HDD/SSD 34 and uses the data to execute the program.

The connection I/F 35 connects the controller 3 to an external equipment. Examples of the external equipment include the position changer 2 and the head 1. The communication I/F 36 allows the controller 3 to communicate with the external device such as the external PC.

Example of Functional Configuration of Controller

FIG. 8 is a block diagram illustrating a functional configuration of the controller 3 according to the first embodiment. The controller 3 includes a communication unit 301, an input/output unit 302, a command data generation unit 303, a skipping unit 304, a verification unit 305, a command unit 306, and a discharge control unit 307.

The controller 3 implements functions of the communication unit 301 and the input/output unit 302 with the communication I/F 36 and the connection I/F 35, respectively. The controller 3 executes a program stored in the ROM 32 with the CPU 31 to implement the functions of the command data generation unit 303, the skipping unit 304, the verification unit 305, the command unit 306, and the discharge control unit 307.

Note that the controller 3 may include functional units other than those units described above. Components other than the controller 3 may have some of the above-described functions of the controller 3. The components other than the controller 3 include the position changer 2, the head 1, and the external PC. The controller 3 and the components other than the controller 3 may be dispersed to implement some of the above-described functions of the controller 3. Alternatively, the controller 3 may implement at least a part of the functions implemented by the CPU 31 with an electric circuit such as an application specific integrated circuit (ASIC) or a field programmable gate array (FPGA).

The communication unit 301 controls communication of signals and data between the controller 3 and the external device such as the external PC. The input/output unit 302 controls input and output of signals and data between the controller 3, and the position changer 2 and the head 1.

The command data generation unit 303 executes a process of generating data of the multiple moving positions Td. For example, the command data generation unit 303 generates the multiple moving positions Td based on the shape data Od input via the communication unit 301.

The skipping unit 304 executes a process of skipping some of the multiple moving positions Td disposed in the predetermined intervals. The skipping unit 304 outputs data of the rest of the multiple moving positions Td, which is not skipped, as a result of skipping to the verification unit 305.

The verification unit 305 executes a process of verifying whether to obtain the desired quality of liquid application when the liquid Q is discharged to the object 200 at the multiple discharge positions P acquired based on the rest of the multiple moving positions Td. When the verification unit 305 verifies that the desired quality of liquid application can be obtained, the verification unit 305 outputs data corresponding to the rest of the multiple moving positions Td to the command unit 306 and outputs data corresponding to the multiple discharge positions P to the discharge control unit 307.

The controller 3 performs verification by the verification unit 305 based on the discharge distance d or the relative angle A. As described above, the controller 3 skips some of the multiple moving positions Td disposed in the predetermined intervals by the skipping unit 304 in accordance with the result of verification by the verification unit 305.

The command unit 306 outputs the drive command Rc to the position changer 2 based on the rest of the multiple moving positions Td input from the verification unit 305 to change the relative position and the relative angle between the object 200 and the head 1.

The discharge control unit 307 controls the discharge of the liquid Q from the head 1 at the multiple discharge positions P.

Example of Moving Position

FIG. 9 is a diagram illustrating an example of the moving position Td generated by the command data generation unit 303.

In FIG. 9, a command "MOVJ" means a joint interpolation command. The joint interpolation is an interpolation command corresponding to a fast-forward command in a numerical control (NC) machine tool. Since a servo motor of each joint of the robot arm is likely to operates with easy movement in the joint interpolation, the path of the head 1 by the interpolation command from the current coordinates to the moving position follows the process by the robot arm. Arguments "X=100 Y=50 Z=0" means X, Y, and Z coordinate values corresponding to the three-dimensional relative position of the head 1. Arguments "A=0 B=45 C=0" means the three-dimensional relative angle of the head 1.

A command "MOVL" means a linear interpolation command. Arguments "X=200 Y=80 Z=11" means X, Y, and Z coordinate values corresponding to the three-dimensional relative position of the head 1, and arguments "A=0 B=30 C=0" means the three-dimensional relative angle of the head 1. The linear interpolation corresponds to a linear interpolation command in the NC machine tool. The head 1 is moved from the current coordinates to the designated point along a linear trajectory (the straight line) by the linear interpolation command. In the present embodiment, the command "MOVL" is preferably used as the first command to precisely drive the robot arm as the position changer 2.

Example of Process Executed by Controller

Process of Generating Moving Position

Figure 10:
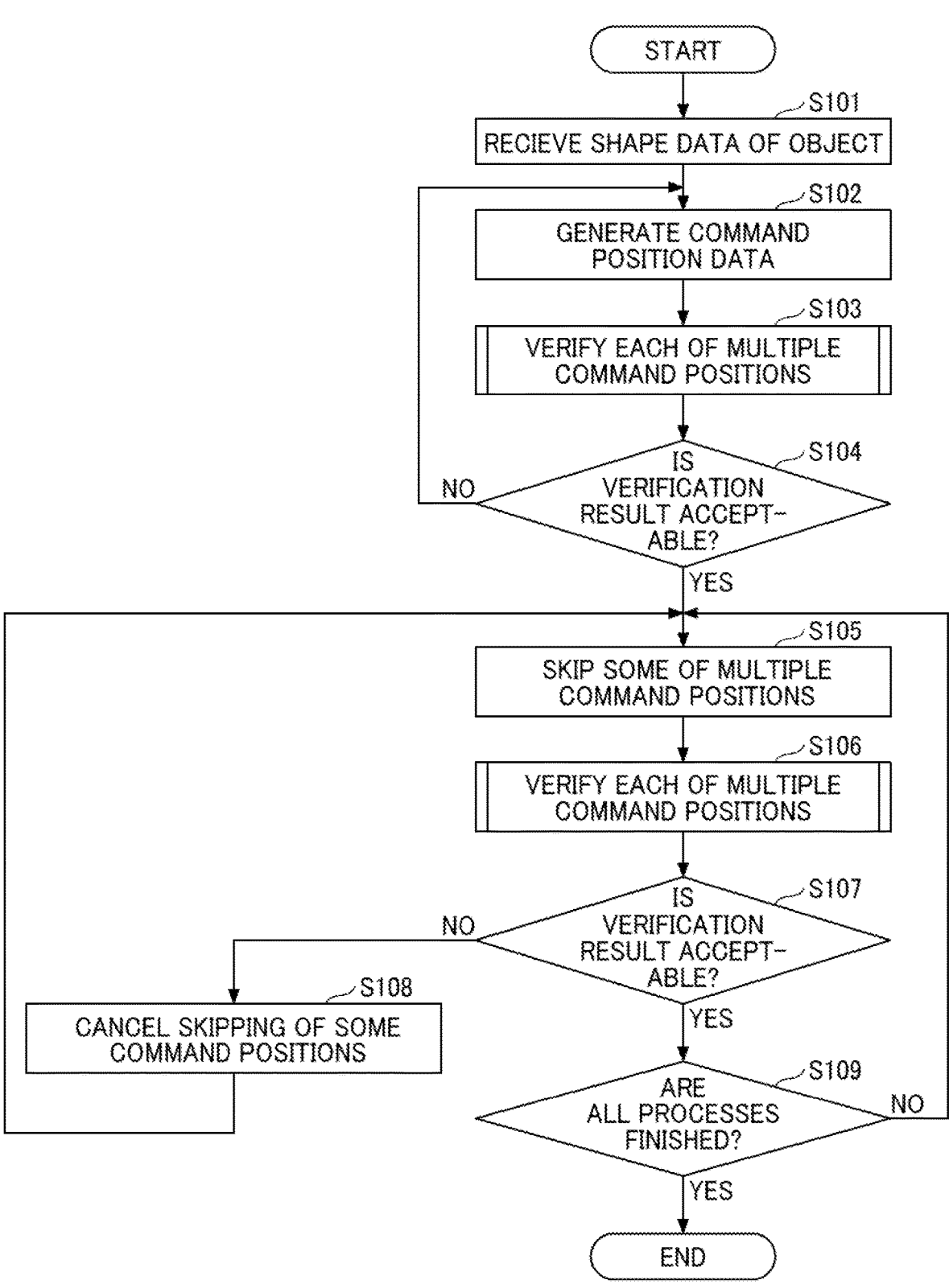
FIG. 10 is a flowchart of an example of a command generation process executed by the controller according to the first embodiment.

FIG. 10 is a flowchart illustrating an example of a process of generating the moving position Td by the controller 3. The controller 3 starts the process illustrated in FIG. 10 in response to an instruction to start the process of generating the moving position Td, which is input by a user, for example. The user can input the instruction with a control panel or the like of the liquid discharge apparatus 10.

In step S101, the controller 3 receives the shape data Od of the object 200 from an external PC or the like via the communication unit 301.

In step S102, the controller 3 determines the linear trajectory based on the shape data Od and causes the command data generation unit 303 to generate data of the multiple moving positions Td along the linear trajectory.

In step S103, the controller 3 causes the verification unit 305 to verify whether to obtain the desired quality of liquid application when the liquid Q is discharged to the object 200 in accordance with each of the multiple moving positions Td generated by the command data generation unit 303.

In step S104, the controller 3 causes the verification unit 305 to determine whether the verification result is acceptable. In step S104, when the verification unit 305 determines that the verification result is acceptable (Yes in step S104), the controller 3 executes the process of step S105. On the other hand, when the verification unit 305 determines that the verification result is not acceptable (No in step S104), the controller 3 executes the process of step S102 again.

In step S105, the controller 3 causes the skipping unit 304 to skip some of the multiple moving positions Td disposed in the predetermined intervals. In other words, the controller 3 reduce the number of the multiple moving positions Td on the linear trajectory.

In step S106, the controller 3 causes the verification unit 305 to verify whether to obtain the desired quality of liquid application when the liquid Q is discharged to the object 200 in accordance with each of the rest of the multiple moving positions Td, which is not skipped by the skipping unit 304.

In step S107, the controller 3 causes the verification unit 305 to determine whether the verification result is acceptable.

In step S107, when the verification unit 305 determines that the verification result is acceptable (Yes in step S107), the controller 3 executes the process of step S109. On the other hand, when the verification unit 305 determines that the verification result is not acceptable (No in step S107), in step S108, the controller 3 cancels the skipping of some of the multiple moving positions Td skipped in step S105. Thereafter, the controller 3 executes the process of step S105 again. In this case, the controller 3 may determine another linear trajectory different from the linear trajectory to generate moving positions Td, and the skipping unit 304 skips the newly generated moving positions Td different from the some of the multiple moving positions Td that are previously skipped in step S105.

In step S109, the controller 3 determines whether to end the process. The controller 3 can determine to end the process in accordance with an input or the like by a user using the control panel of the liquid discharge apparatus 10. When the controller 3 determines to end the process in step S109 (Yes in step S109), the process ends. When the controller 3 determines not to end the process in step S109 (No in step S109), the controller 3 continues the process from step S105 again. As described above, the controller 3 can generate the data of the moving positions Td.

Verification Process

Figure 11:
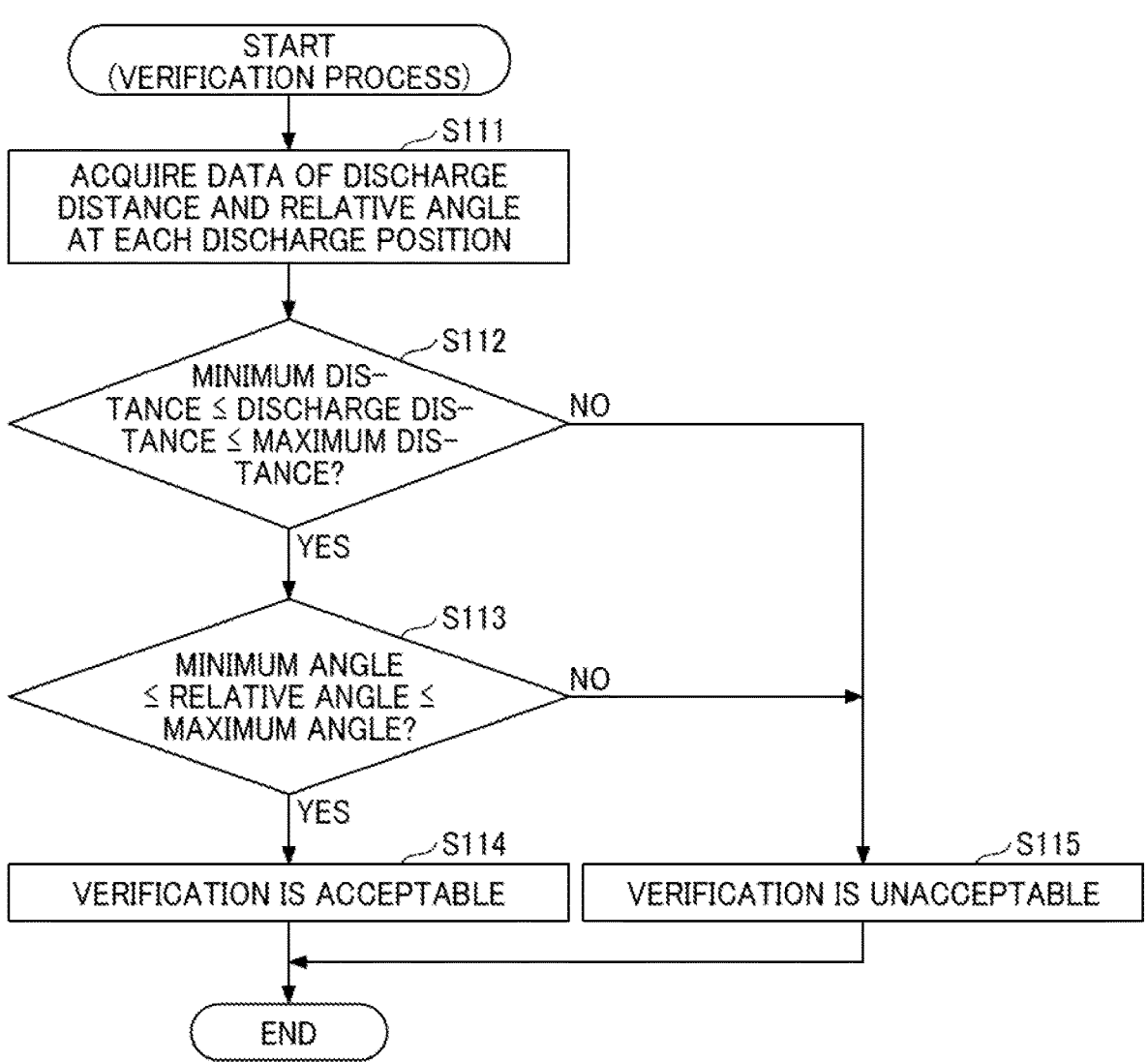
FIG. 11 is a flowchart of an example of a verification process executed by the controller according to the first embodiment.

FIG. 11 is a flowchart illustrating an example of a verification process executed by the controller 3. The controller 3 starts the verification process illustrated in FIG. 11 at the timing of step S103 or step S106 of FIG. 10.

In step S111, the controller 3 causes the verification unit 305 to acquire data of the discharge distance d and the relative angle A at each of the multiple discharge positions P by calculation.

In step S112, the controller 3 causes the verification unit 305 to determine whether the discharge distance d at each of the multiple discharge positions P is within the range between the minimum distance dn and the maximum distance dx.

In step S112, when the verification unit 305 determines that the discharge distance d remains between the minimum distance dn and the maximum distance dx (Yes in step S112), the controller 3 proceeds to the process of step S113. When the verification unit 305 determines that the discharge distance d does not remain between the minimum distance dn and the maximum distance dx (No in step S112), the controller 3 proceeds to the process of step S115 to determine that the verification result is not acceptable.

In step S113, the controller 3 causes the verification unit 305 to determine whether the relative angle A at each of the multiple discharge positions P is within the range between the minimum angle An and the maximum angle Ax.

In step S113, when the verification unit 305 determines that the relative angle A remains between the minimum angle An and the maximum angle Ax (Yes in step S113), the controller 3 proceeds to the process of step S114 to determine that the verification result is acceptable. When the verification unit 305 determines that the relative angle A does not remain between the minimum angle An and the maximum angle Ax (No in step S113), the controller 3 proceeds to the process of step S115 to determine that the verification result is not acceptable.

As described above, the controller 3 executes the process of verifying whether to obtain the desired quality of liquid application when the liquid Q is discharged to the object 200 at the multiple discharge positions P acquired based on the multiple moving positions Td.

Example of Operation of Liquid Discharge
Apparatus

Figure 12:
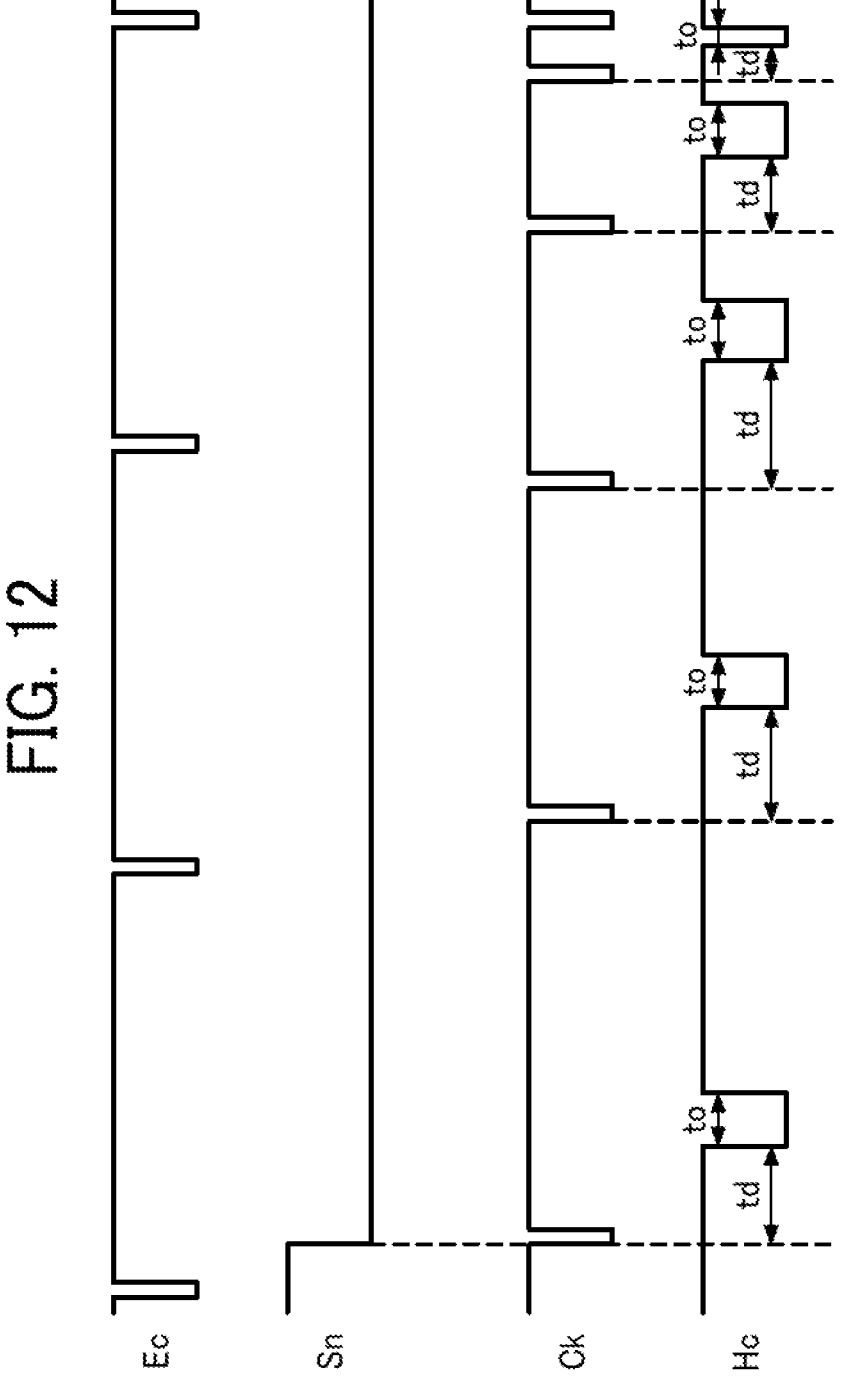
FIG. 12 is a timing chart of an operation of the liquid discharge apparatus according to the first embodiment.

FIG. 12 is a timing chart illustrating an example of an operation of the liquid discharge apparatus 10. In FIG. 12, a position signal Ec indicates an output signal from a rotary encoder of the position changer 2. The controller 3 acquires the relative position and the relative angle of the head 1 held by the position changer 2 based on the position signal Ec by calculation.

A synchronization signal Sn is a signal for synchronizing the change of the relative position and the relative angle by the position changer 2 with the discharge of the liquid Q by the head 1. The synchronization signal Sn is output from the position changer 2 and input to the controller 3.

An interval signal Ck is a signal serving as a reference for defining the minimum interval of liquid application by the liquid discharge apparatus 10. For example, when the minimum interval of liquid application is 100 dots per inch (dpi) (i.e., 0.254 mm), every time the head 1 moves 0.254 mm, the interval signal Ck of one pulse is output from the controller 3 to the head 1.

The drive signal Hc (i.e., the discharge command) is a signal for discharging the liquid Q from the head 1. A delay td indicates a delay time with respect to the interval signal Ck, and the discharge time to indicates a time during which the nozzle of the head 1 is opened to discharge the liquid Q. The delay td varies depending on the discharge distance d, a discharge speed, and the like. The discharge time to varies depending on the amount of the liquid Q to be discharged.

Effects of Liquid Discharge Apparatus

As described above, the liquid discharge apparatus 10 includes the head 1, the position changer 2, and the controller 3. The head 1 has a nozzle. The head 1 discharges the liquid Q from the nozzle to apply the liquid Q onto a surface of the object 200. The head 1 has a prescribed discharge condition. The position changer 2 changes the relative position between the object 200 and the head 1. The controller 3 determines a linear trajectory along which the position changer 2 moves the head 1 based on the prescribed discharge condition, outputs a first command including multiple moving positions Td along the linear trajectory to the position changer 2 1 to cause the position changer 2 to move the head 1 along the linear trajectory and outputs a second command including multiple discharge positions P to the head 1 to cause the head 1 to discharge the liquid Q at multiple discharge positions P.

Thus, the controller 3 controls the change of the relative position by the position changer 2 so that the discharge distance d between a surface of the object 200 and the head 1 in a normal direction of the surface of the object 200 is different in at least one of the multiple discharge positions P. The liquid discharge apparatus 10 does not adjust the relative position of the head 1 so as to make the discharge distance d uniform at each of the multiple discharge positions P, thereby preventing the moving speed of the head 1 from decreasing. Accordingly, the liquid discharge apparatus 10 having good productivity can be provided.

In the present embodiment, the controller 3 skips some of the multiple moving positions Td disposed in predetermined intervals based on the discharge distance d. In other words, the controller 3 reduces the number of the multiple moving positions Td on the linear trajectory based on the discharge distance d between the surface of the object 200 and the head 1 in the normal direction 200a of the surface of the object 200. Since some of the multiple moving positions Td are skipped, the number of times of adjusting the discharge distance d can be reduced. Accordingly, the moving speed of the head 1 can be prevented from decreasing, and the liquid discharge apparatus 10 having good productivity can be provided.

In the present embodiment, the controller 3 skips some of the multiple moving positions Td when the discharge distance d at each of the multiple discharge positions remains between the predetermined minimum distance dn and the predetermined maximum distance dn. In other words, the prescribed discharge condition includes the maximum dischargeable distance and the minimum dischargeable distance, and the controller 3 reduces the number of the multiple moving positions Td at which the discharge distance d between the surface of the object 200 and the head 1 in the normal direction 200a of the surface of the object 200 is within a range between the maximum dischargeable distance and the minimum dischargeable distance for each of the multiple discharge positions. Some of the multiple moving positions Td are skipped within the conditions to keep the desired quality of liquid application by the liquid discharge apparatus 10, thereby preventing the decrease in productivity of the liquid discharge apparatus 10 while keeping the desired quality of liquid application.

In the present embodiment, the position changer 2 further changes the relative angle A between the object 200 and the head 1. The controller 3 changes at least one of the relative position or the relative angle A at a position the linear trajectory changes to make the discharge distance d different in at least one of the multiple moving positions Td. The liquid discharge apparatus 10 does not adjust the relative position and the relative angle A of the head 1 so as to make the discharge distance d uniform at each of the multiple discharge positions P, thereby preventing the moving speed of the head 1 from decreasing. Accordingly, the liquid discharge apparatus 10 having good productivity can be provided.

In the present embodiment, the controller 3 skips some of the multiple moving positions Td disposed in predetermined intervals based on the relative angle A. In other words, the controller 3 reduces the number of the multiple moving positions Td on the linear trajectory based on the relative angle A. Since some of the multiple moving positions Td are skipped, the number of times of adjusting the relative angle A can be reduced. Accordingly, the moving speed of the head 1 can be prevented from decreasing, and the liquid discharge apparatus 10 having good productivity can be provided.

In the present embodiment, the controller 3 skips some of the multiple moving positions Td when the relative angle A at each of the multiple discharge positions remains between the predetermined minimum angle An and the predetermined maximum angle An. In other words, the prescribed discharge condition includes the maximum dischargeable angle and the minimum dischargeable angle, and the controller 3 reduces the number of the multiple moving positions Td at which the discharge distance d between the surface of the object 200 and the head 1 in the normal direction 200a of the surface of the object 200 is within a range between the maximum dischargeable angle and the minimum dischargeable angle for each of the multiple discharge positions. Some of the multiple moving positions Td are skipped within the conditions to keep the desired quality of liquid application by the liquid discharge apparatus 10, thereby preventing the decrease in productivity of the liquid discharge apparatus while keeping the desired quality of liquid application.

Second Embodiment

A liquid discharge apparatus 10a according to a second embodiment of the present disclosure is described. The same components as those of the first embodiment are denoted by the same reference numerals, and redundant description thereof is appropriately omitted.

In the present embodiment, the head 1a has multiple nozzles. The controller 3 skips some of the multiple moving positions Td based on the discharge distance d or the relative angle A at each of the multiple nozzles.

Configuration of Head

Figure 13:
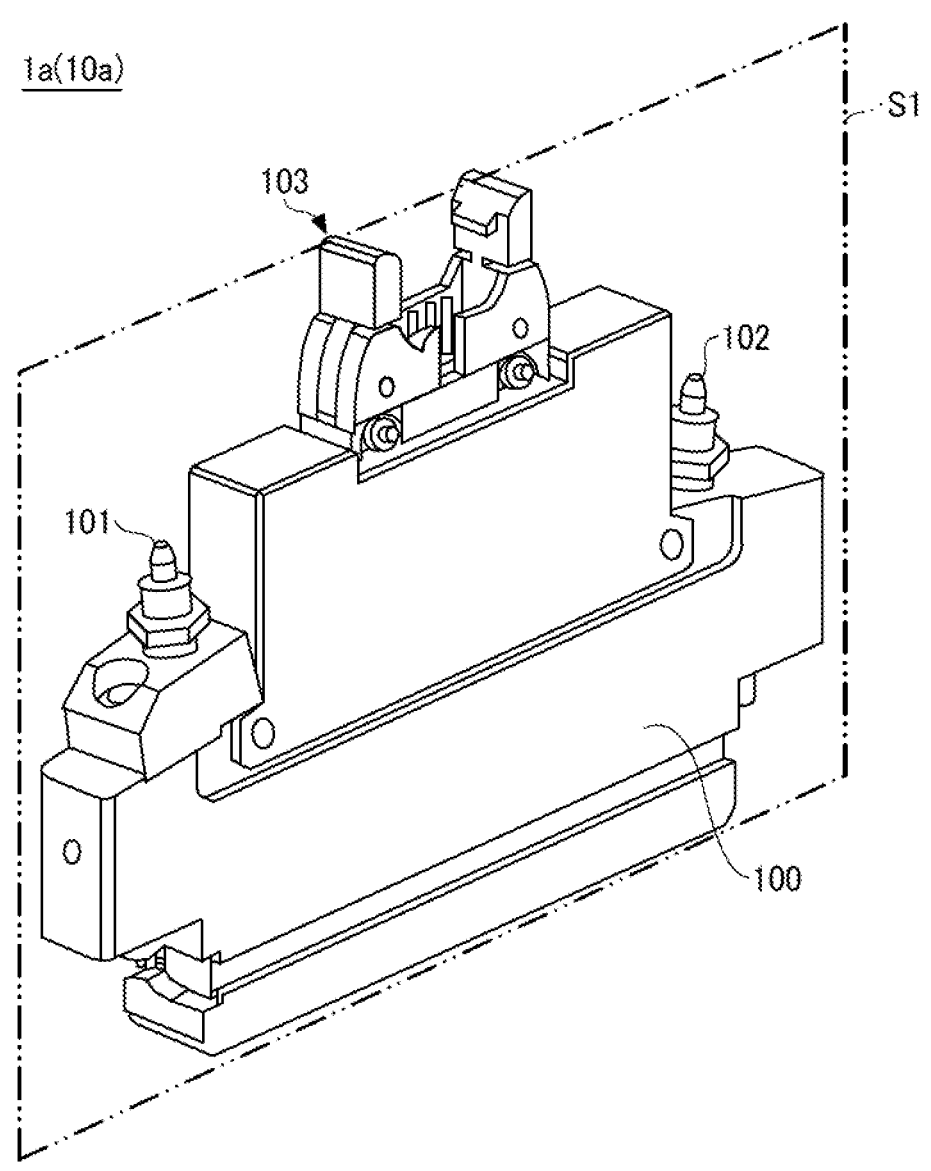
FIG. 13 is a perspective view of a head of a liquid discharge apparatus according to a second embodiment of the present disclosure.
Figure 14:
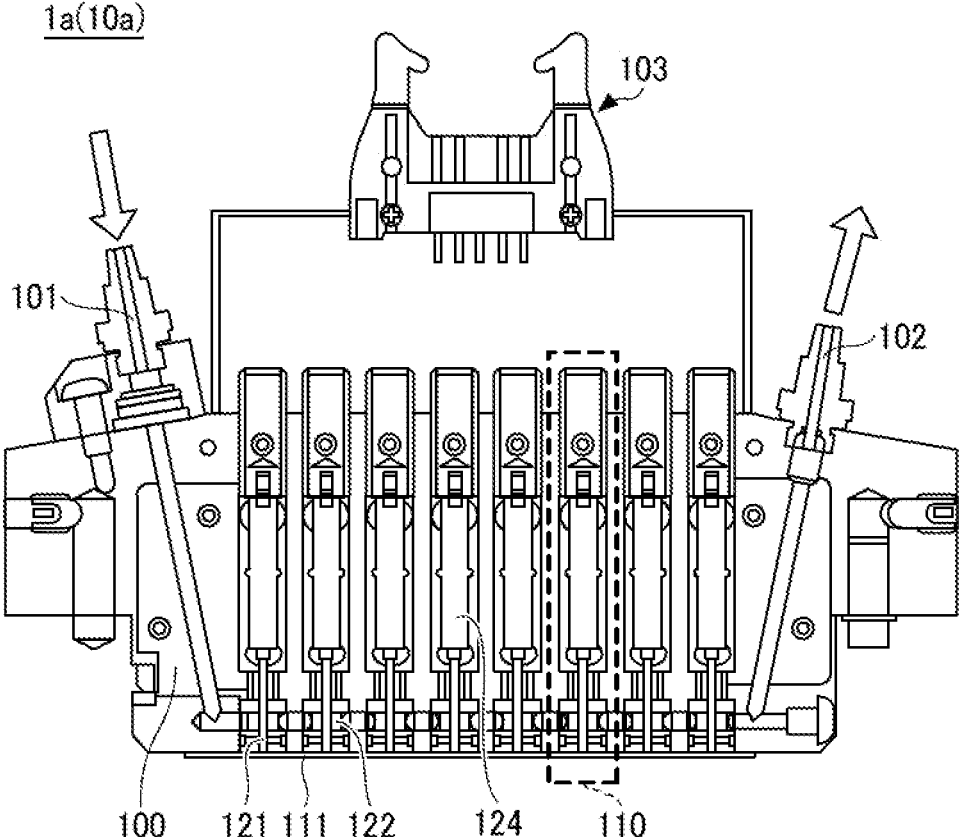
FIG. 14 is a cross-sectional view of the head taken along a plane S1 in FIG. 13.

FIGS. 13 and 14 are schematic views of a head 1a included in a liquid discharge apparatus 10a. FIG. 13 is a perspective view of the head 1a, and FIG. 14 is a cross-sectional view of the head 1a taken along a plane S1 in FIG. 13.

As illustrated in FIGS. 13 and 14, the head 1a includes a housing 100, a supply port 101, a collection port 102, a connector 103, and multiple discharge modules 110. In the head 1a, the liquid Q pressurized from the outside is supplied to the discharge modules 110 through the supply port 101, and the liquid Q that is not discharged is drained to the outside through the collection port 102. The connector 103 is disposed in the housing 100 to receive the drive signal Hc from the controller 3.

The multiple discharge modules 110 are arranged in one row or a plurality of rows in the housing 100. The discharge module 110 includes a nozzle plate 111, a channel 122, and a piezoelectric element 124. The nozzle plate 111 has multiple nozzles 121 from which the liquid Q is discharged. The nozzle plate 111 is joined to the housing 100. The channel 122 communicates with the nozzle 121 to supply the pressurized liquid Q to the nozzle 121. Further, the channel 122 is shared with the multiple liquid discharge modules 110 in the housing 100. The piezoelectric element 124 drives a needle-shaped valve that opens and closes the nozzle 121.

The head 1a is a valve jet type that individually opens and closes the multiple nozzles 121 to discharge the liquid Q from each of the multiple nozzles 121 to the object 200. The discharge module 310 may temporarily stop draining the liquid Q from the collection port 102 while discharging the liquid Q to the object 200 from the nozzle 121 to prevent a decrease in a liquid discharge efficiency from the nozzle 121. The liquid discharge apparatus 10a includes, but not limited to, the head 1a of valve jet type, and may include a head of another type such as piezoelectric drive or electrostatic drive.

Figure 15:
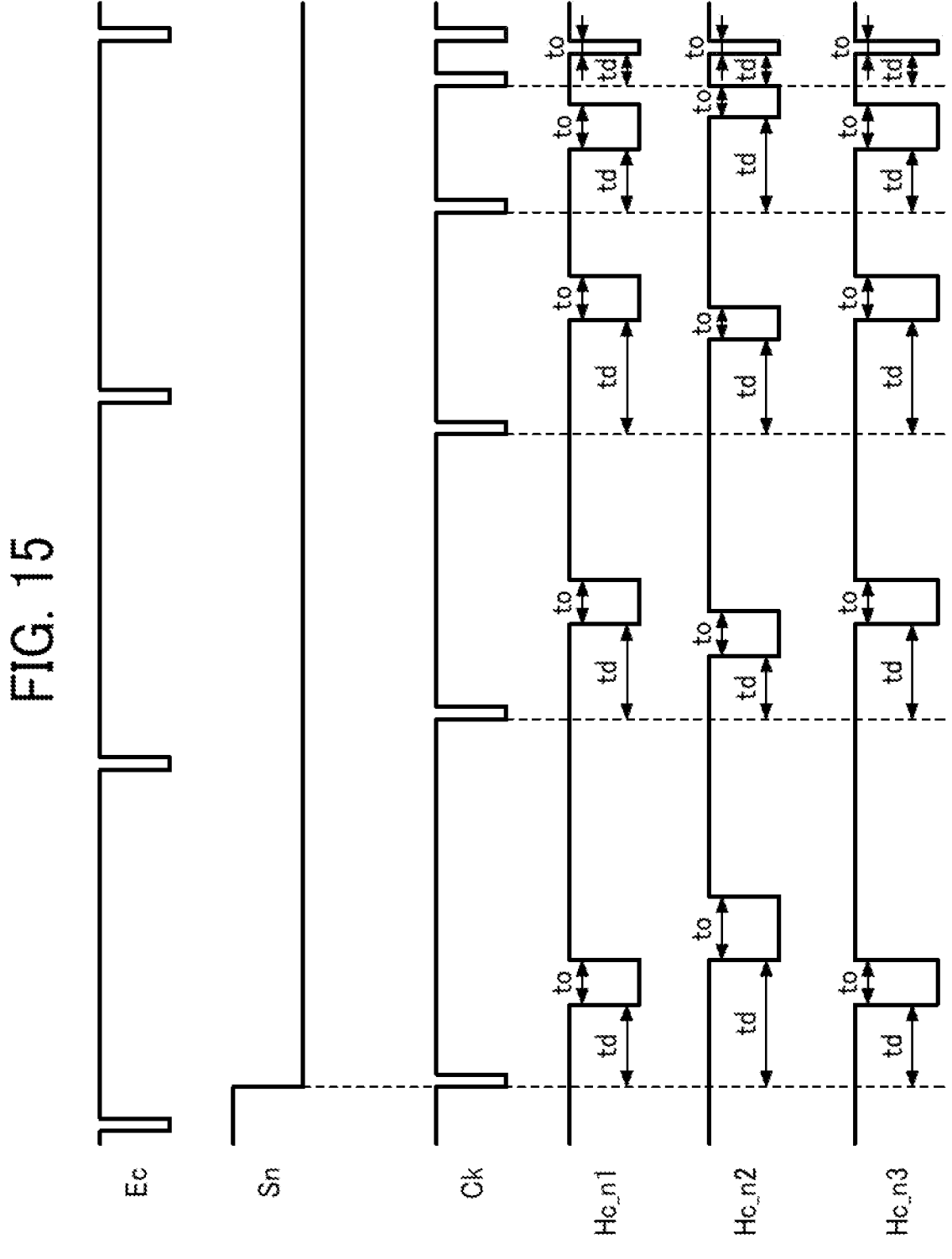
FIG. 15 is a timing chart of an operation of the liquid discharge apparatus according to the second embodiment.

FIG. 15 is a timing chart illustrating an example of the operation of the liquid discharge apparatus 10a. The position signal Ec, the synchronization signal Sn, and the interval signal Ck are the same as those in FIG. 12.

The drive signal Hc_n1 is a signal for discharging the liquid Q from a first nozzle among the multiple nozzles 121 of the head 1a. The drive signal Hc_n2 is a signal for discharging the liquid Q from a second nozzle among the multiple nozzles 121 of the head 1a. The drive signal Hc_n3 is a signal for discharging the liquid Q from a third nozzle among the multiple nozzles 121 of the head 1a. The delay td and the discharge time to are the same as those in FIG. 12. In the present embodiment, three drive signals Hc are exemplified, but the number of drive signals Hc can be appropriately changed in accordance with the number of nozzles included in the head 1a.

As described above, in the present embodiment, the head 1a has the multiple nozzles 121. The controller 3 skips some of the multiple moving positions Td based on the discharge distance d or the relative angle A at each of the multiple nozzles 121. In other words, the controller 3 reduces the number of the multiple moving positions Td on the linear trajectory based on the discharge distance d between the surface of the object 200 and the head 1 in the normal direction 200a of the surface of the object 200 for each of the multiple nozzles. Accordingly, even when the head 1a has the multiple nozzles 121, the liquid discharge apparatus 10a does not adjust the relative position of the head 1a so as to make the discharge distance d uniform at each of the multiple discharge positions P, thereby preventing the moving speed of the head 1a from decreasing. Accordingly, the liquid discharge apparatus 10a having good productivity can be provided.

Although the embodiments have been described above, embodiments of the present disclosure are not limited to the above embodiments. That is, various modifications and improvements can be made within the scope of the present disclosure.

In the above-described embodiments, examples of the liquid discharged from the head 1 include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. These liquids can be used for, e.g., inkjet ink, coating paint, surface treatment solution, a liquid for forming components of electronic element or light-emitting element or a resist pattern of electronic circuit, or a material solution for three-dimensional fabrication.

The object 200 represents a material onto which liquid is adhered and fixed, a material into which liquid is adhered to permeate, or the like. Specific examples of the "material onto which liquid can adhere" include, but are not limited to, a body of a vehicle, a construction material, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Embodiments also include a liquid discharge method. A liquid discharge method includes discharging a liquid from a nozzle of a head to apply the liquid onto a surface of an object. The head has a prescribed discharge condition. The method further includes changing a relative position between the object and the head, determining a linear trajectory along which the head moves based on the prescribed discharge condition, outputting a first command including multiple moving positions along the linear trajectory to move the head along the linear trajectory, and outputting a second command including multiple discharge positions to the head to discharge the liquid at multiple discharge positions. Accordingly, a discharge distance between a surface of the object and the head in a normal direction of the surface of the object is different in at least one of the multiple discharge positions. Such a liquid discharge method can provide operational effects equivalent to those of the above-described liquid discharge apparatus.

Embodiments also include a storage medium storing computer-readable program instructions and a computer-readable program product. For example, a non-transitory storage medium storing a plurality of instructions which, when executed by one or more processors, causes the processors to perform a method including discharging a liquid from a nozzle of a head to apply the liquid onto a surface of an object. The head has a prescribed discharge condition. The method further includes changing a relative position between the object and the head, determining a linear trajectory along which the head moves based on the prescribed discharge condition, outputting a first command including multiple moving positions along the linear trajectory to move the head along the linear trajectory, and outputting a second command including multiple discharge positions to the head to discharge the liquid at multiple discharge positions. Accordingly, a discharge distance between a surface of the object and the head in a normal direction of the surface of the object is different in at least one of the multiple discharge positions. A storage medium or a computer-readable program product including such program code can provide operational effects equivalent to those of the above-described liquid discharge apparatus.

As described above, according to the present disclosure, the liquid discharge apparatus having good productivity can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:
a head having a nozzle, the head configured to discharge a liquid from the nozzle to apply the liquid onto a surface of an object, the head having a prescribed discharge condition;
a position changer having an arm that holds the head, the position changer configured to change a relative position between the object and the head; and
circuitry configured to:
determine a linear trajectory along which the position changer moves the head based on the prescribed discharge condition, the linear trajectory having a start position where the head starts moving and an end position where the head ends moving;
output a first command to cause the position changer to adjust a position of the head by moving the position changer, such that a discharge distance between the nozzle and the surface of the object in a normal direction of the surface of the object is set to be a prescribed distance at the start position and the end position of the linear trajectory; and
output a second command to cause the head to discharge the liquid, while being moved by driving the arm of the position changer, at multiple discharge positions, wherein
the circuitry is further configured to skip outputting the first command while outputting the second command along the linear trajectory.

2. The liquid discharge apparatus according to claim 1, wherein the prescribed discharge condition includes a maximum dischargeable distance and a minimum dischargeable distance; and
the circuitry is further configured to skip outputting the first command in a case in which the discharge distance is within a range between the maximum dischargeable distance and the minimum dischargeable distance for each of the multiple discharge positions.

3. The liquid discharge apparatus according to claim 1, wherein the head further has multiple nozzles including the nozzle, and
the circuitry is further configured to skip outputting the first command based on the discharge distance for each of the multiple nozzles.

4. The liquid discharge apparatus according to claim 1, wherein the position changer is further configured to change a relative angle between the object and the head, and
the circuitry is further configured to cause the position changer to change at least one of the relative position or the relative angle at a position at which the linear trajectory changes.

5. The liquid discharge apparatus according to claim 4, wherein the circuitry is further configured to skip outputting the first command based on the relative angle.

6. The liquid discharge apparatus according to claim 4, wherein the prescribed discharge condition includes a maximum dischargeable angle and a minimum dischargeable angle; and
the circuitry is further configured to skip outputting the first command, so as not to cause the position changer to change the relative angle between the object and the head, in a case in which the relative angle is within a range between the maximum dischargeable angle and the minimum dischargeable angle for each of the multiple discharge positions.

7. The liquid discharge apparatus according to claim 4, wherein the head further has multiple nozzles including the nozzle, and
the circuitry is further configured to skip outputting the first command based on the relative angle for each of the multiple nozzles.

8. The liquid discharge apparatus according to claim 1, wherein the circuitry is further configured to change a timing for discharging the liquid from the nozzle depending on the discharge distance.

9. The liquid discharge apparatus according to claim 1, wherein the circuitry is further configured to change a timing for discharging the liquid from the head depending on a discharge speed of discharging the liquid.

10. The liquid discharge apparatus according to claim 1, wherein the circuitry is further configured to change a timing for discharging the liquid from the head depending on an amount of the liquid to be discharged.

11. A liquid discharge method comprising:
discharging a liquid from a nozzle of a head to apply the liquid onto a surface of an object, the head having a prescribed discharge condition;
changing a relative position between the object and the head by a position changer having an arm that holds the head;
determining a linear trajectory along which the head moves based on the prescribed discharge condition, the linear trajectory having a start position where the head starts moving and an end position where the head ends moving;
outputting a first command to cause the position changer to adjust a position of the head by moving the position changer, such that a discharge distance between the nozzle and the surface of the object in a normal direction of the surface of the object is set to be a prescribed distance at the start position and the end position of the linear trajectory; and
outputting a second command to discharge the liquid, while being moved by driving the arm of the position changer, at multiple discharge positions, wherein
the first command is skipped while outputting the second command along the linear trajectory.

12. A non-transitory storage medium storing a plurality of instructions which, when executed by one or more processors, causes the processors to perform a method, comprising:

discharging a liquid from a nozzle of a head to apply the liquid onto a surface of an object, the head having a prescribed discharge condition;

changing a relative position between the object and the head by a position changer having an arm that holds the head;

determining a linear trajectory along which the head moves based on the prescribed discharge condition, the linear trajectory having a start position where the head starts moving and an end position where the head ends moving;

outputting a first command to cause the position changer to adjust a position of the head by moving the position changer, such that a discharge distance between the nozzle and the surface of the object in a normal direction of the surface of the object is set to be a prescribed distance at the start position and the end position of the linear trajectory; and outputting a second command to discharge the liquid, while being moved by driving the arm of the position changer, at multiple discharge positions, wherein the first command is skipped while outputting the second command along the linear trajectory.

\* \* \* \* \*